(12) United States Patent
Taylor

(10) Patent No.: US 11,550,861 B1
(45) Date of Patent: *Jan. 10, 2023

(54) DISSEMINATION OF INFORMATION UPDATES ACROSS DEVICES

(71) Applicant: Wells Fargo Bank, N.A., San Francisco, CA (US)

(72) Inventor: Benjamin S. Taylor, Williston, VT (US)

(73) Assignee: Wells Fargo Bank, N.A., San Francisco, CA (US)

( * ) Notice: Subject to any disclaimer, the term of this patent is extended or adjusted under 35 U.S.C. 154(b) by 180 days.

This patent is subject to a terminal disclaimer.

(21) Appl. No.: 17/006,195

(22) Filed: Aug. 28, 2020

Related U.S. Application Data

(63) Continuation of application No. 15/383,487, filed on Dec. 19, 2016, now Pat. No. 10,762,148.

(51) Int. Cl.
*G06F 17/30* (2006.01)
*G06F 16/9535* (2019.01)
*H04L 67/306* (2022.01)
*G06Q 40/06* (2012.01)

(52) U.S. Cl.
CPC ........ *G06F 16/9535* (2019.01); *H04L 67/306* (2013.01); *G06Q 40/06* (2013.01)

(58) Field of Classification Search
CPC ........ G06F 16/13; G06F 16/24; G06F 16/156; G06N 3/00; G06N 5/00; G05B 13/00
See application file for complete search history.

(56) References Cited

U.S. PATENT DOCUMENTS

| | | | |
|---|---|---|---|
| 6,473,084 B1 | 10/2002 | Phillips et al. | |
| 7,249,080 B1 | 7/2007 | Hoffman et al. | |
| 7,801,787 B2 | 9/2010 | Jain et al. | |
| 8,315,922 B2 | 11/2012 | Frank et al. | |
| 8,676,691 B2 | 3/2014 | Schiller | |
| 8,682,767 B2 | 3/2014 | Brazdzionis et al. | |
| 8,996,629 B1 | 3/2015 | Datar et al. | |
| 9,792,372 B2 | 10/2017 | Bai et al. | |

(Continued)

OTHER PUBLICATIONS

"U.S. Appl. No. 15/383,487, Examiner Interview Summary dated Nov. 25, 2019".

(Continued)

*Primary Examiner* — Hung D Le
(74) *Attorney, Agent, or Firm* — Schwegman Lundberg & Woessner, P.A.

(57) ABSTRACT

A system, method, and computer media are provided for combining and transmitting information to a device and via a channel of a user. The method comprises receiving a plurality of news elements, which are stored in a database. A relevance score is determined of the news elements in the news element database for a plurality of user elements stored in a user portfolio in the memory of the processing system. News elements are selected from the database based on the relevance score. The method further comprises determining at least one of an active device and an active channel of the user, reformatting the selected news elements into story components based on the determined device and channel into story components, and transmitting the story components to the active device and via the active channel of the user.

20 Claims, 5 Drawing Sheets

(56) References Cited

U.S. PATENT DOCUMENTS

| | | |
|---|---|---|
| 10,095,752 B1 | 10/2018 | Schmitt et al. |
| 10,552,428 B2 | 2/2020 | Shivaswamy et al. |
| 10,762,148 B1 | 9/2020 | Taylor |
| 2004/0117831 A1* | 6/2004 | Ellis .................. H04N 21/4755 348/E7.071 |
| 2007/0143794 A1 | 6/2007 | Negi |
| 2010/0088314 A1 | 4/2010 | Kuang |
| 2011/0067065 A1* | 3/2011 | Karaoguz ............ H04N 21/472 725/40 |
| 2011/0087679 A1 | 4/2011 | Rosato et al. |
| 2012/0173454 A1 | 7/2012 | Shah et al. |
| 2015/0020106 A1* | 1/2015 | Belyaev ........... H04N 21/44226 725/48 |
| 2015/0199763 A1 | 7/2015 | Birkhead et al. |
| 2015/0235242 A1 | 8/2015 | Labriola et al. |
| 2015/0286726 A1 | 10/2015 | Rush |
| 2015/0339692 A1 | 11/2015 | Poreh |
| 2015/0365725 A1* | 12/2015 | Belyaev ............. H04N 21/6175 725/46 |
| 2016/0012055 A1 | 1/2016 | Bai et al. |
| 2016/0112358 A1 | 4/2016 | Ghafourifar et al. |
| 2017/0132230 A1 | 5/2017 | Muralidhar et al. |
| 2017/0262448 A1 | 9/2017 | Paulsen et al. |
| 2017/0270121 A1 | 9/2017 | Gu et al. |
| 2017/0351679 A1 | 12/2017 | Shivaswamy et al. |

OTHER PUBLICATIONS

"U.S. Appl. No. 15/383,487, Final Office Action dated Dec. 13, 2019", 10 pgs.

"U.S. Appl. No. 15/383,487, Non Final Office Action dated Jun. 7, 2019".

"U.S. Appl. No. 15/383,487, Non Final Office Action dated Nov. 14, 2018".

"U.S. Appl. No. 15/383,487, Notice of Allowance dated Apr. 15, 2020", 8 pgs.

"U.S. Appl. No. 15/383,487, Response filed Mar. 13, 2020 to Final Office Action dated Dec. 13, 2019".

"U.S. Appl. No. 15/383,487, Response filed Apr. 15, 2019 to Non Final Office Action dated Nov. 14, 2018", 10 pgs.

"U.S. Appl. No. 15/383,487, Response filed Oct. 7, 2019 to Non-Final Office Action dated Jun. 7, 209", 9 pgs.

\* cited by examiner

US 11,550,861 B1

DISSEMINATION OF INFORMATION UPDATES ACROSS DEVICES

CROSS-REFERENCE TO RELATED APPLICATION

This application is a continuation of U.S. patent application Ser. No. 15/383,487, filed Dec. 19, 2016, which is incorporated by reference herein in its entirety.

TECHNICAL FIELD

Described herein is a system and method that generally relate to electronically disseminating information to users, for example and without limitation, disseminating information to users related to their interests across different devices and/or electronic channels of communication.

BACKGROUND

Traditional print media has historically been digested by readers in relatively large pieces. It would not be unusual for a reader to spend thirty minutes to an hour with a newspaper or magazine to get information of relevance to them. Modern electronics have made it possible for readers to digest information in much smaller pieces, which is beneficial, since most people do not have the time to easily digest all of the important information they should know about topics of relevance to them. The ways for consuming data in the course of one's day or week generally involves interacting with multiples devices, such as a computer, tablet, phone, watch, television, etc.

BRIEF DESCRIPTION OF THE DRAWINGS

In the drawings, which are not necessarily drawn to scale, like numerals may describe similar components in different views. Like numerals having different letter or numeric suffixes may represent different instances of similar components. The drawings illustrate generally, by way of example, but not by way of limitation, various embodiments discussed in the present document.

DETAILED DESCRIPTION

Figure 1A:
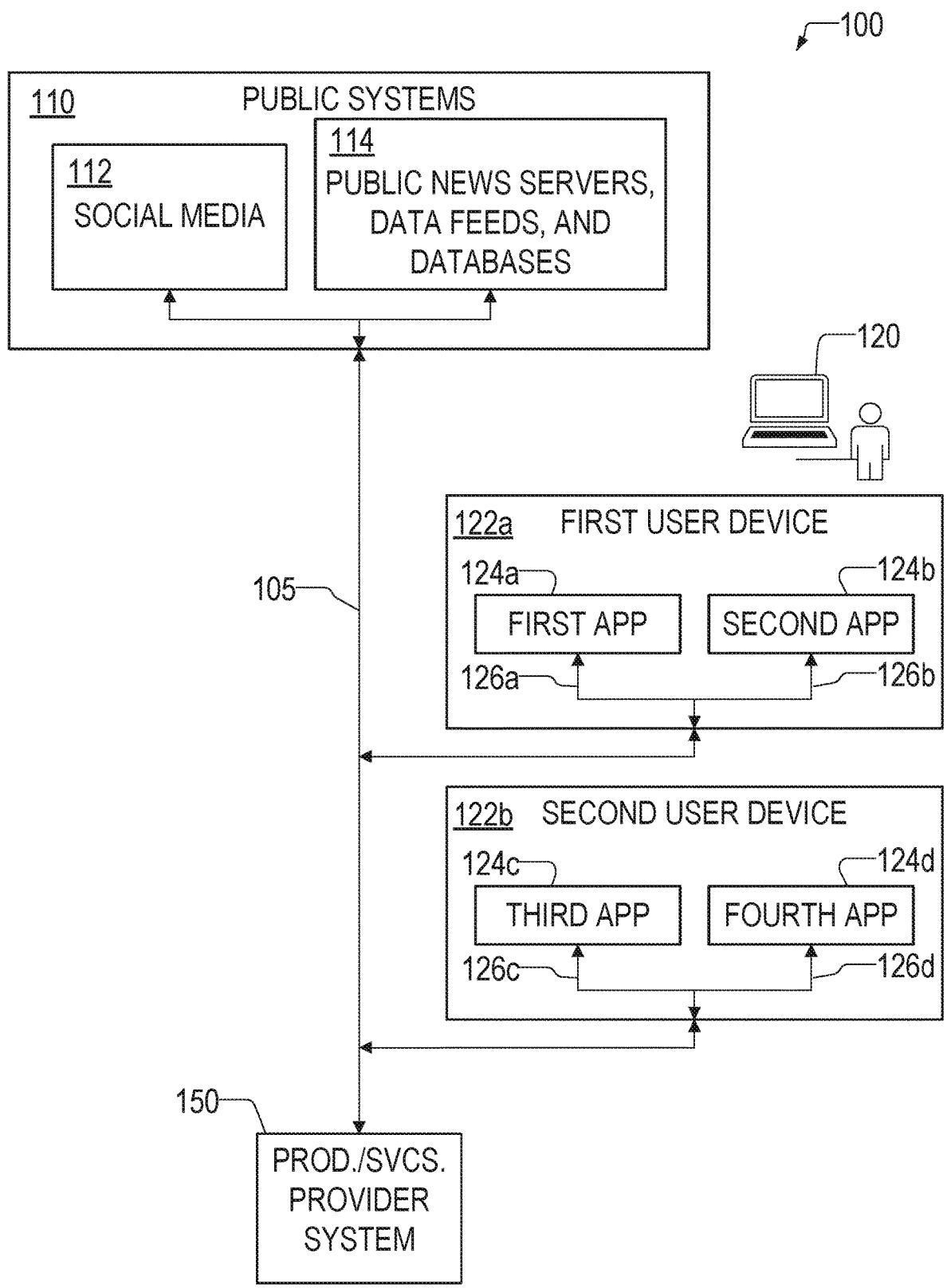
FIG. 1A is a block diagram of an example of a system for disseminating information updates across devices.

Given the modern propensity to consume information in smaller pieces and utilizing different devices, it would be beneficial to aggregate information accessible through the Internet and filter it in a way so that a user may be presented with information that is relevant to the topics of relevance to them. Such aggregated and filtered information may be stitched together into a story for the user at a predefined interval (e.g. daily, weekly, etc.) and disseminated to the user in a systematic way via a desired media and device. This permits improving operations of a network communications scheme by determining active user devices and channels, assembling relevant content, and communicating it via a network to the user in a device and channel appropriate manner. In this way, the disseminated information can more effectively take advantage of the network and the particulars of the user's active device and channels and may help the user to connect with information significant to their interests at periodic times and on particular devices throughout their regular routine.

Although an illustrative example used throughout this disclosure is where the topics of relevance to the user are their financial portfolio holdings, the system described herein is not so limited and may be broadly applied to any indicated topics of relevance to the user, illustrated in the FIGS. as user elements (of interest) in a user portfolio, or a collection of interests. Such an application of the system and methods described herein may allow better delivery of services or provide additional touch points with a client through digital offerings and getting information to the client in a more seamless way. Clients who may be primarily self-directed investors, may build a portfolio and may want information about their portfolio and its performance. This desired information may relate to their underlying holdings, information about people involved with various companies or business sectors. So for a predefined time period, there might be a roster of information that may be conveyed to the client over the course of the time period. This roster of information may be disseminated to the client throughout their day while they interact with different channels on different devices. A channel may constitute any way and format in which information is delivered and/or consumed by a user. It may take into account protocols used to communicate the information as well as applications used to create, interpret and present the communicated information. Non-limiting examples include a web browser using HTML, social media applications, such as Facebook, Twitter, communication programs, such as email, and chat programs and protocols, etc. The channel may also take into account particulars of the device for example, a web browser on a PC may be considered a different channel than a web browser on a smart phone, due to display, bandwidth, and UI differences.

In the drawings, certain reference numbers may have a letters (e.g., 100a, 100b), decimal point numbers (e.g., 100.1, 100.2), prime indicators (e.g., 100', 100"), or some combination of these (e.g., 100.1a, 100.2b), when referencing instances of like objects. Use of the number alone (e.g., 100) may be used to refer to an arbitrary instance of an object or to some or all of the objects collectively.

Based on the above, disclosed herein is a computer-implemented method for combining and transmitting information to a device and via an electronic channel of a user. An example method comprises receiving a user-provided indication of a user device and channel to receive information on and receiving a plurality of news elements at a network interface of a processing system. The news elements are stored in a news element database that may reside in a memory of the processing system. A relevance score is determined of the news elements in the news element database for a plurality of user elements stored in a user portfolio in the memory of the processing system. News elements are selected from the news elements database based on the relevance score. The method further comprises determining at least one of an active device and an active channel of the user, reformatting the selected news elements into story components based on the determined device and channel into story components, and transmitting the story components to the active device and via the active channel of the user over the network interface. Other example methods and variants of this method are described herein.

A non-transitory computer-readable storage medium may be provided that includes instructions that, when executed by a computer, cause the computer to perform operations of the methods described herein.

Disclosed herein is also a system comprising a hardware processor, a network interface connected to the hardware processor that is connected to a network, and a non-volatile memory connected to the hardware processor and the network interface comprising. The memory comprises a user portfolio comprising user elements, user application data, a news elements database, and a story components database. A further memory also has instructions executable by the processor, comprising, a news element receiver that receives news elements over the network interface and stores them in the news element database, a relevance assessor that determines a relevance score of the news elements for a plurality of the user elements, a relevance filter that selects news elements from the news elements database based on the relevance score, a formatter that reformats the selected news elements into story components based on at least one of a determined active device and active channel of the user, and a transmitter that transmits the story components to the user over the network interface.

Figure 1B:
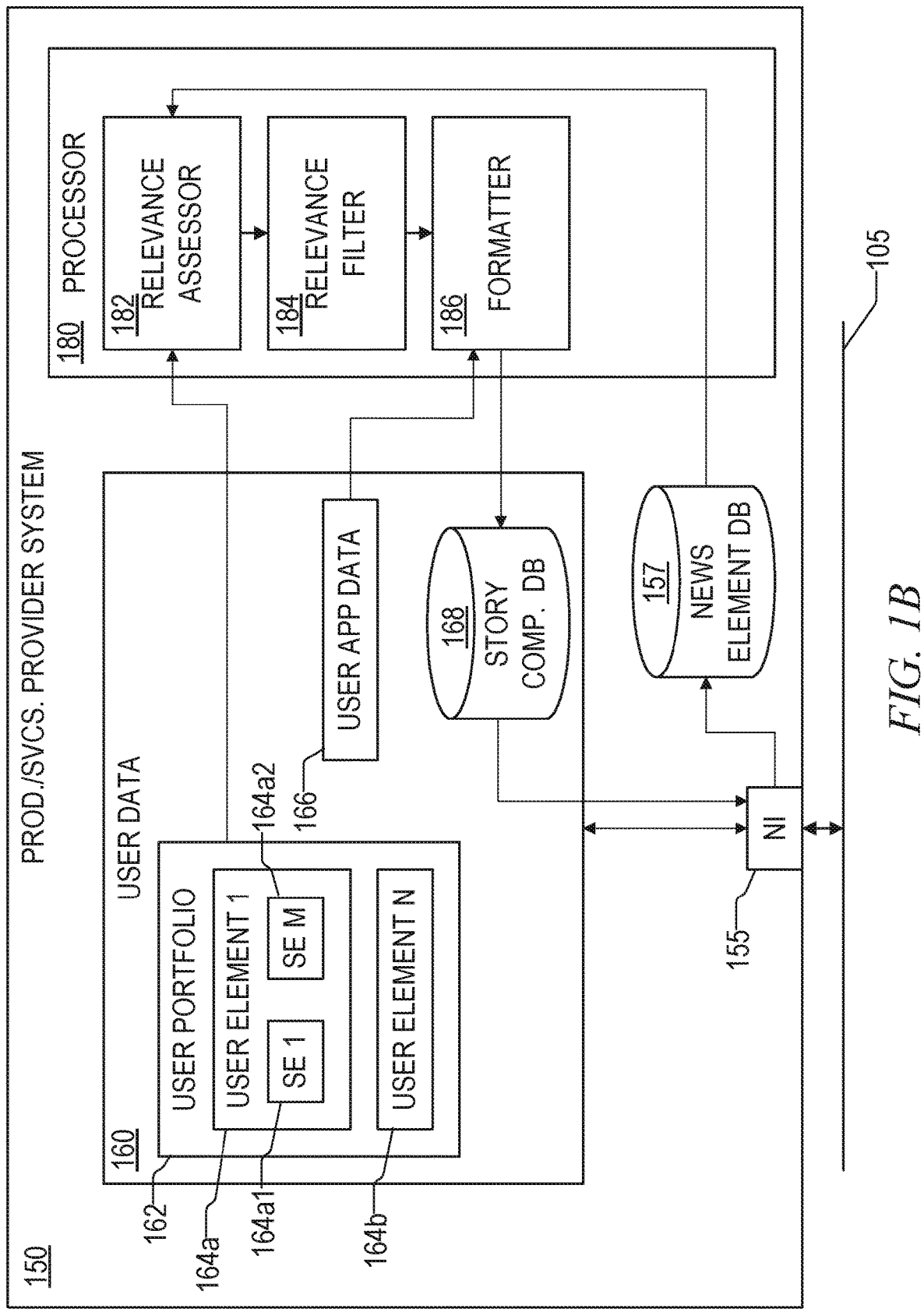
FIG. 1B is a block diagram that expands the product/services provider system component shown in FIG. 1A.

FIG. 1A is a block diagram of an example of a system 100 for disseminating information updates across user devices, and FIG. 1B is a block diagram that expands the product/services provider system component shown in FIG. 1A. The system 100 may involve public (information) systems 110, a user 120, and a product/services provider system 150 that are connected together by a network 105.

The public systems 110 serve as a source for news that is collected and ultimately sent to the users 120. The public systems 110 may include channels over social media 112, such as Facebook, LinkedIn, Twitter), and it may also include channels over public news servers, data feeds, and databases 114, such as news sites (e.g., Wall Street Journal (WSJ), CNN), audio (e.g., Bloomberg Radio, Amazon Echo), etc. It may include data from regulatory filings, such as 10Ks, news clips, etc. These public systems 110 may be accessible via the network 105.

The user 120 is considered to receive information over one or more user devices 122. In the example described herein, the user has a first user device 122a, and a second user device 122b. The user devices 122 may be machines 300, as described below, and may include a smartphone, tablet device, desktop computer, etc. Typically, two devices 122a, 122b of a user might differ in some aspects. For example, the first user device 122a might be a smartphone designed to be a size that may fit in a shirt pocket. Such a device 122a may run the Android operating system and use a touch screen, voice, and speakers as primary user interface elements. The second user device 122b might be a desktop computer that runs the Microsoft Windows operating system and utilizes one or more large monitors, a keyboard, mouse, camera, audio inputs and outputs, etc.

In this example, the second user device 122b has considerably more power and resources than the first user device 122a. Therefore, each user device 122 may run different applications that are more appropriate for the platform. For example, the first user device 122a may run Twitter as a first application 124a for communicating data, and a mobile based web browser as a second application 124b for communicating data. The second user device 122b may utilize a high-end browser, such as Microsoft Edge, as a third application 124c, and a dedicated client application as a fourth application 124d. Each of the applications 124a-124d may communicate via a respective communication channel 126a-126d that operates over the network 105.

As illustrated in FIG. 1B, the provider system 150 may comprise a network interface 155 that connects the provider system 150 to the network 105, via which the provider system 150 may communicate with the user 120 and public systems 110. The provider system 150 may further comprise user data 160 and a processor 180, which may comprise a computer processor and hardware or software components 182, 184, 186 that execute on the computer processor. These components 182, 184, 186 may be stored in a memory location separately from a physical processing unit (not shown separately) that executes program instructions comprising the components 182, 184, 186. It may also comprise a news element database 157 that is used to hold news elements obtained over the network 105 by a news element receiver (not shown) that retrieves the news elements and puts them in the news element database 157.

The user 120 may initially establish certain user data 160 with the provider system 150. This user data 160 may be established in a number of ways. For example, some of it may be entered via a user interaction with the provider system 150, such as via a web page. Other user data 160 may be entered by a manager (not shown) associated with the provider system 150. Any mechanism may be utilized for entering the user data 160 into the provider system 150.

As illustrated in FIG. 1B, a user portfolio 162 is created which may contain a plurality of user elements 164a, 164b. Although an example described herein is where the user portfolio 162 is an investment portfolio, the system in general is not so limited, and may comprise any information or representations of entities that are of interest to the user 120. For example, someone interested in purchasing an automobile may create a portfolio of car models that they are considering, or a stamp collector may create a portfolio of regions, time periods, and types of stamps they are interested in. In the investment portfolio example, the user elements 164 may constitute components that make up the user investment portfolio. These may include, by way of example only, individual stocks, bonds, exchange traded funds (ETFs), mutual funds, real estate investment trusts (REITs), commercial properties, residential properties, insurance contracts, private equity, etc.

A user element 164a may be further broken down into sub-elements 164a1, 164a2. For example, if the user element 164a is a mutual fund, then the sub-elements 164a1, 164a2 may be individual components, such as individual stocks, that make up the mutual fund. When the user portfolio 162 is an investment portfolio, it may be an actual investment portfolio maintained by the user or it may be a potential portfolio represented a desired or a test portfolio whose performance may be compared against the actual portfolio. A user 120 may maintain any number of portfolios 162. The portfolios 162 may be used to align things with the user's intended actions in the future, such as distributions from a 401(k) or an investment retirement account (IRA). It may also be used for a universe of things, financial and non-financial alike, from which the user may draw.

The user 120 may next establish a user profile and define one or a plurality of channels through which they receive information, such as the channels 126 described above. The defined channels 126 may be stored in the user application data 166. The user 120 may then register one or a plurality of devices 122 through which they interact and engage with the channels 126. The device information may also be stored in the user application data 166. The user application data

166 may also contain an active or a current device and current channel that is being used by the user 120. The story component database 168 contains elements of relevant news (as described in further detail below) stories that may be ultimately transmitted to the user 120.

The provider system 150 may collect news elements either independently of various users' data 162 or based on it. When collecting news elements independently, the provider system 150 may sign up to receive various news feeds by, for example, registering with the news feed sites, or it may use bots to scan or scrape web pages and acquire the news items. It may be desirable to apply a filter at this stage to define a universe of topics that the provider system 150 will collect information on. The universe of topics could include a predefined set of topics that relate to products and services of the provider system 150 and/or relate to topics related to the users' data 162. For example, a predefined set of topics could be defined by keywords, and the news elements could be retained or ignored based on whether the keywords can be found in a received news element.

Alternately, when users' data 162 is used, the provider system 150 may limit its collection activities to those sources relevant to the plurality of users' data 162. The news elements may be collected continuously or on some periodic basis. As shown in FIG. 1B, the collected news elements may be stored in a news element database 157. The news elements may be stored as complete articles that include text, images, multimedia, etc., as links or pointers to sources for the news element, as a combination of both, and/or be a summary of the source information. The news element database 157 may hold all of the news elements collected, or each user may have their own news element database 157, in which case there may be a plurality of news element databases 157. The news element databases 157 may also be organized according to some predefined criteria, such as by company, index, mutual funds, etc.

Based on some predefined criteria, such as the expiration of a timer (e.g., hourly, daily, weekly) or upon a user request, an analysis of the news elements in the news element database 157 is undertaken. A relevance assessor 182 of the processor 180 determines a relevance factor for the news elements based on the user elements 164 in the user portfolio 162. The relevance factor (e.g., a rating of 0% to 100%) may be determined by a number of criteria. In the financial portfolio example, the first user element 164a might be shares of stock A, and a second user element 164b might be shares of stock B. A quantity of shares in the portfolio might influence the relevance factor. If the user owns ten times more of stock A (in quantity or value) than stock B, then the relevance factor for news elements related to stock A may be accordingly increased.

This may be applied to the user sub-elements 164a1, 164a2 as well. For example, if the user element is a mutual fund, and the mutual fund has ten times more (value or quantity) of stock A than stock B, then a proportional weighting may be applied. In this scenario, however, news elements directly related to the mutual fund itself may be independently weighted. The converse may also be possible, i.e., separate user elements that relate to a common topic may create an additional weighting to influence the relevance factor. For example, if five of the user elements 164 are tagged as being related to the energy industry (the tagging may be performed either manually or by an automated process that utilizes keywords associated with the user index), then the relevance factor of an energy related news element may be further increased beyond the effect of each of the five user elements independently. Any criteria or formulas may be utilized to establish a relevance factor by the relevance assessor 182. Also, the user elements 164 or user sub-elements 164a1, 164a2, may contain tags (not shown) that identify them as being related to various topics. The tags themselves may be weighted to indicate a degree of relevance to a particular topic.

The relevance may be based on subsectors of a market. If one of the user elements is a REIT in natural resources, the system might not only gather and send information about the underlying holdings, but also related articles that affect those holdings. For example, the system may collect information about what is going on in the geopolitical environment in the Middle East, and be able to provide an indication to the user that oil is going to rise with an analysis of this geopolitical environment.

Once a relevance of the news elements has been assigned to some collection of news elements in the news element database 157, a relevance filter 184 may be applied so that only those news elements having a certain level of relevance are passed on to the user. The relevance level threshold may be a predefined value, or it may vary, based on any number of criteria, including a particular device and channel that is being utilized by a user at a time of creating a story component for the user 120. For example, a user element may be shares of General Electric stock in a user's portfolio. A detailed Wall Street Journal article may discuss the health care industry in general, and may have a call out for an aspect of General Electric's medical diagnostic machines. The article may be assigned a relevance level of 75% with regard to the user's General Electric stock. A predefined threshold could be established by the user or by a system administrator that anything having a relevance level greater than 70% should be sent to the user. However, this may be modified by saying that a weighting factor could diminish the relevance level, (e.g., to 35%) if the user is on a smartphone, since most users would not wish to read a lengthy article on a smartphone.

In one configuration, the provider system 150 formats and stitches together story components in the story components database 168. News elements that have been determined to be relevant through the relevance filter 184 may then be formatted for presentation to the user by the formatter 186, which takes the relevant news elements and formats them in a way that is appropriate for an active user device and active user channel that may be obtained from the user device 122 over the network 105 and stored in the user application data 166. This active user information may be obtained from an app that is running on the user device 122. For example, if the active user device is a smartphone, and the active channel is Twitter, then the formatter 186 might create story components that are short and text-based these may then be tweeted to the user 120. If the active user device is a desktop computer and the active channel is a web browser accessing an application on the provider system 150, then the story components might be full multi-media-based web pages with text, pictures, video, etc. It may also contain links to more in-depth resources, such as PDF journal articles.

The active user device/channel may be ones that the user is currently interacting with this may be detected by the user's activity (e.g., the detection of a tweet by an application receiving tweets from the user) or by an application running on the user's device (e.g., the application detects that a web browser is running and reports this to the provider system 150). An active device/channel may also simply be one that the user is available to receive information on. For example, a user's email channel may always be active, even though the user does not have her email program open at the time. More than one device or channel may be active at the same time, and the provider system 150 may favor a particular device or channel according to a predefined indicator stored in the user application data 166 or based upon some other predefined algorithm, such as favoring lowest bandwidth device or device with the largest displayable area. The story components may also be sent to more than one device or through multiple channels if configured by the user or system to do so.

The formatter 186 may take into effect the screen size, user interface devices for interaction, device bandwidth, etc. in order to determine how to best format the relevant news elements into story components. In another example, if the prioritized "headline" in a user's story is that job starts are up, thereby creating positive sentiment in the market, and the user is on Twitter on their mobile device, the information may be shown as a tweet or link. Conversely, if the user was on their tablet reading the WSJ, an article might be highlighted for them to read.

Once the story components have been created and stored in the story component database 168, the story components may be stitched together into a full/complete story that spans a predetermined time period by a story combiner that may be presented to the user 120. The stitching together may be actual, (e.g., creating a single cohesive web page containing all or portions of the relevant story) components, or virtual, (e.g., simply keeping track of a group of story) components that should be viewed by the user. This stitching together may be optional.

In one configuration, the story represents a complete set of information that should be presented to the user in a particular time period, even though it may be presented to the user in smaller pieces, for example, the story components. If feedback or tracking information from a feedback receiver or tracker that tracks which of the story components have been read may be received from the user indicating that the story component has been viewed on the user device 122, then the provider system 150 may make a record of that and not attempt to provide the story component to the user again. The feedback may be received in the form of detecting a web page visit or detecting a duration of a web page visit, detecting a user link click, a response to an email message, etc. The system may estimate whether a user has engaged with a displayed part of the story, for instance by confirming a link was clicked, monitoring how long a user paused on something shown to them, or potentially through a mechanism by which the user may acknowledge that they have engaged with the information via, for example, a checkbox, swipe, etc.

The provider system 150 may also vary the aggressiveness that components of the story are presented to the user 120 based on time or some other predefined criteria. For example, if it has been detected that only seven of ten relevant story components has been viewed by a user on a particular day, the provider system 150 may change the device and/or channel to more aggressively provide these three story components to the user, for example, via an email towards the end of the day. The degree of aggressiveness and change of presentation channel may be set by the user and stored, for example, in the user application data 166. The provider system 150 may repeat the process of displaying story components to the user until the story has been fully disseminated to the user, or the user acknowledges that they no longer need or want the information. The user 120 may be able to adjust their preferences for receiving information, which may be stored in the user application data 166.

In the financial user portfolio 162 example, the story components provided to the user may include, but are not limited to: Information provided by the system may include, but it not limited to: a) total change in market value of the portfolio; b) general performance of overall markets and indices; c) specific performance of indices which the user is "weighted" in, for example, the Russell 2000; d) articles or information related to changes in the user's portfolio which help the user understand why changes in their portfolio occurred, for example, an article summarizing a recent OPEC meeting if the user is weighted in energy stocks, and e) information that supports the user's risk tolerance (in which case, the provider system 150 may prompt changes), for example, mortgage defaults are on the rise, interest rates are decreasing, etc.

Figure 2:
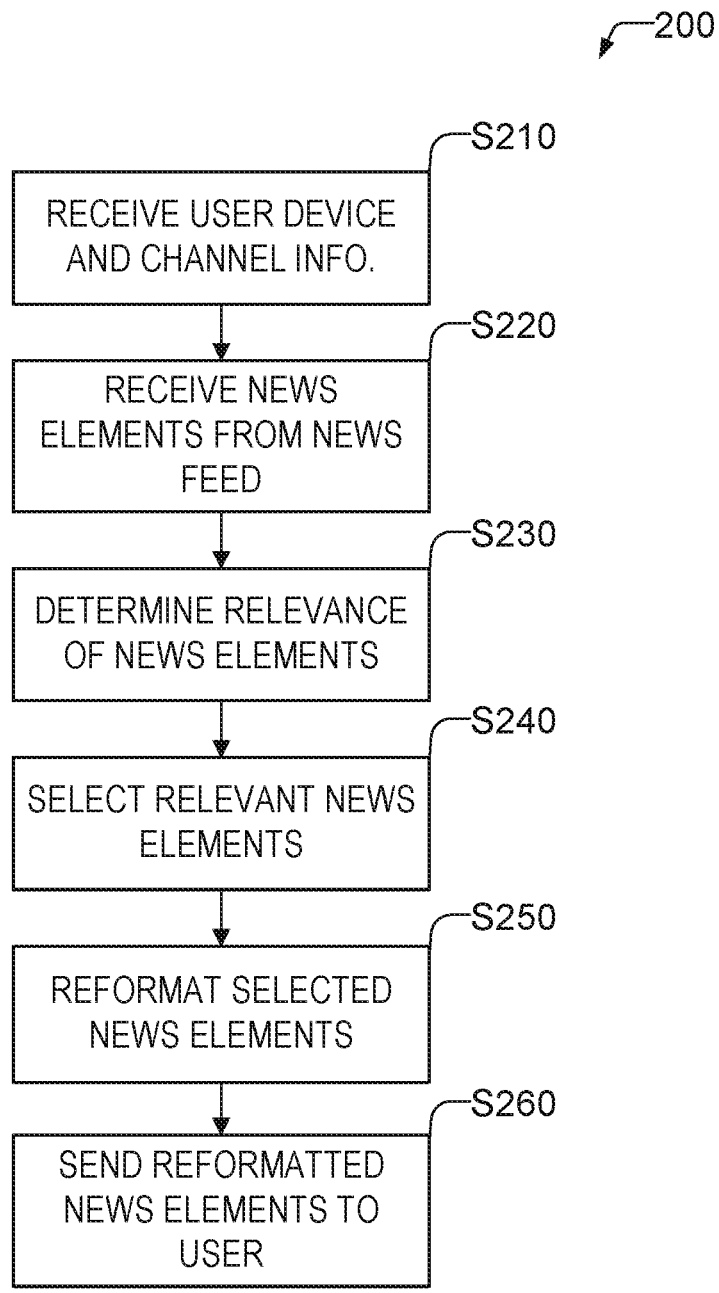
FIG. 2 is a flowchart of an example of a process for dissemination of information updates across devices.

FIG. 2 is a high level flowchart of the process 200 that may be used. In operation S210, the initial user information is received, which includes not only the user portfolio(s), but also the user's indication of devices and channels to receive information over. In operation S220, the system obtains news elements from various sources on the network and may save these in a database. In operation S230, a relevance of the news elements to items in the user's portfolio is determined, and in operation S240, news elements meeting a certain relevance threshold are selected. In operation S250, those selected news elements are reformatted according to a particular user device and user channel. The particular user device and user channel may be those actively in use by the user. The reformatted news elements may then be sent to the user's device and over the determined channel.

General Computer and Network Architecture

Figure 3:
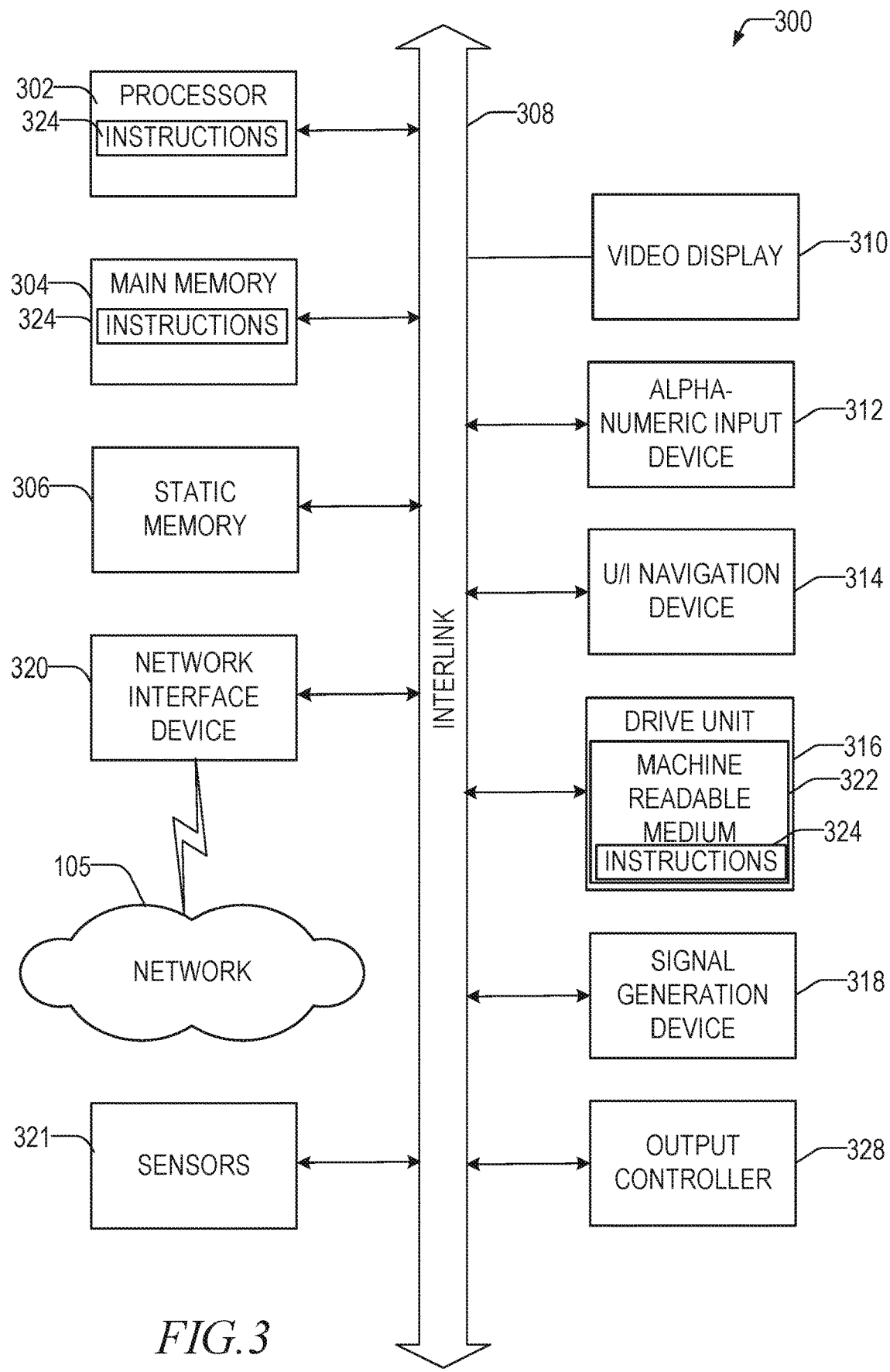
FIG. 3 is a block diagram illustrating a machine that may be a computer on which various processes described herein may be performed.

To describe some configurations in greater detail, reference is made to examples of hardware structures and interconnections usable in the designs of the present disclosure. FIG. 3 is a block diagram illustrating a machine that may be a computer on which various processes described herein may be performed. The machine (e.g., computer system) 300 may include a hardware processor 302 (e.g., a central processing unit (CPU), a graphics processing unit (GPU), a hardware processor core, or any combination thereof), a main memory 304 and a static memory 306, some or all of which may communicate with each other via an interlink (e.g., bus) 308. The machine 300 may further include a display unit 310, an alphanumeric input device 312 (e.g., a keyboard), and a user interface (UI) navigation device 314 (e.g., a mouse). In an example described herein, the display unit 310, input device 312 and UI navigation device 314 may be a touch screen display. The machine 300 may additionally include a storage device (e.g., drive unit) 316, a signal generation device 318 (e.g., a speaker), a network interface device 320, and one or more sensors 321, such as a global positioning system (GPS) sensor, compass, accelerometer, or other sensor. The machine 300 may include an output controller 328, such as a serial (e.g., universal serial bus (USB)), parallel, or other wired or wireless (e.g., infrared (IR), near field communication (NFC), etc.) controller connection to communicate or control one or more peripheral devices (e.g., a printer, card reader, etc.).

The storage device 316 may include a machine readable medium 322 on which is stored one or more sets of data structures or instructions 324 (e.g., software) embodying or utilized by any one or more of the techniques or functions described herein. The instructions 324 may also reside, completely or at least partially, within the main memory 304, within static memory 306, or within the hardware processor 302 during execution thereof by the machine 300. In an example, one or any combination of the hardware processor 302, the main memory 304, the static memory 306, or the storage device 316 may constitute machine readable media.

While the machine readable medium 322 is illustrated as a single medium, the term "machine readable medium" may include a single medium or multiple media (e.g., a centralized or distributed database, and/or associated caches and servers) configured to store the one or more instructions 324.

The term "machine readable medium" may include any medium that is capable of storing, encoding, or cat tying instructions for execution by the machine 300 and that cause the machine 300 to perform any one or more of the techniques of the present disclosure, or that is capable of storing, encoding or carrying data structures used by or associated with such instructions. Non-limiting machine readable medium examples may include solid-state memories, and optical and magnetic media. Specific examples of machine readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine readable media may include non-transitory machine readable media. In some examples, machine readable media may include machine readable media that is not a transitory propagating signal.

The instructions 324 may further be transmitted or received over the communications network 105 using a transmission medium via the network interface device 320. The term "transmission medium" is defined herein to include any medium that is capable of storing, encoding, or carrying instructions for execution by the machine, and includes digital or analog communications signals or other medium to facilitate communication of such software.

The machine 300 may communicate with one or more other machines 300 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UNITS) family of standards, peer-to-peer (P2P) networks, virtual private networks (VPN), or any other way of transferring data between machines 300. In an example, the network interface device 320 may include one or more physical jacks (e.g., Ethernet, coaxial, or phone jacks) or one or more antennas to connect to the communications network 326.

In an example, the network interface device 320 may include a plurality of antennas to wirelessly communicate using at least one of single-input multiple-output (SIMO), multiple-input multiple-output (MEMO), or multiple-input single-output (MISO) techniques. In some examples, the network interface device 320 may wirelessly communicate using Multiple User MIMO techniques.

A wide variety of computing devices may constitute a machine 300, as described herein. The following list includes a variety of devices that may fit the definition of a machine 300: a personal data assistant (PDA), a cellular telephone, including a smartphone, a tablet computing device, a laptop computer, a desktop computer, a workstation, a server computer, a mainframe computer, and the like.

Figure 4:
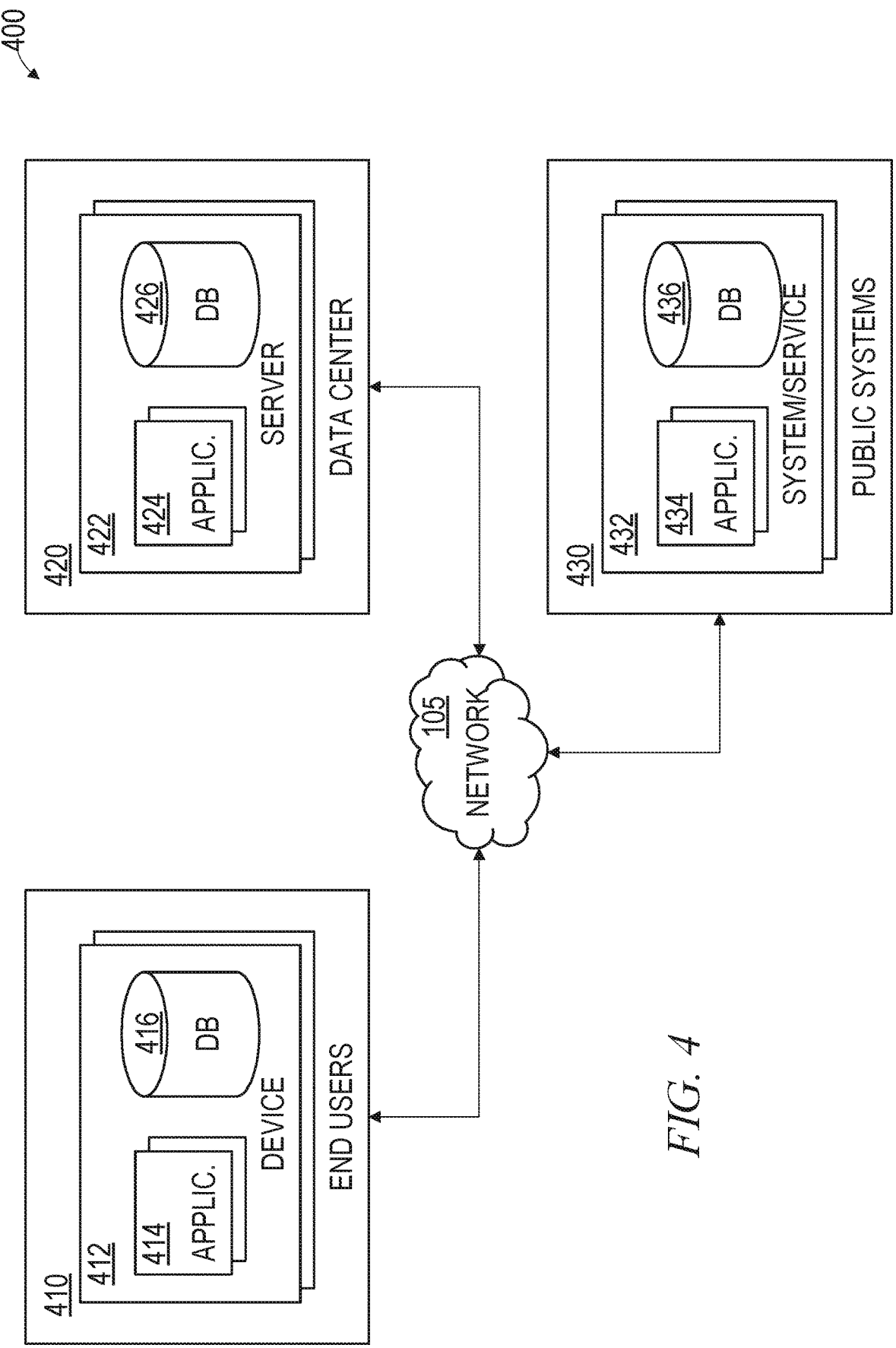
FIG. 4 is a block diagram of a distributed computing system.

FIG. 4 is a block diagram of a distributed system 400 that may include a client-server architecture or cloud computing system. Distributed system 400 may have one or more end users 410. An end user 410 may have various computing devices 412, which may be machines 300 as described above. The end-user computing devices 412 may comprise applications 414 that are either designed to execute in a stand-alone manner, or interact with other applications 414 located on the device 412 or accessible via the network 105. These devices 412 may also comprise a data store 416 that holds data locally, the data being potentially accessible by the local applications 414 or by remote applications.

The system 400 may also include one or more data centers 420. A data center 420 may be a server 422 or the like associated with a business entity that an end user 410 may interact with. The business entity may be a computer service provider, as may be the case for a cloud services provider, or it may be a consumer product or service provider, such as a retailer. The data center 420 may comprise one or more applications 424 and databases 426 that are designed to interface with the applications 414 and databases 416 of end-user devices 412. Data centers 420 may represent facilities in different geographic locations where the servers 422 may be located. Each of the servers 422 may be in the form of a machine(s) 300.

The system 400 may also include publicly available systems 430 that comprise various systems or services 432, including applications 434 and their respective databases 436. Such applications 434 may include news and other information feeds, search engines, social media applications, and the like. The systems or services 432 may be provided as comprising a machine(s) 300.

The end-user devices 412, data center servers 422, and public systems or services 432 may be configured to connect with each other via the network 105, and access to the network by machines may be made via a common connection point or different connection points, e.g. a wireless connection point and a wired connection. Any combination of common or different connections points may be present, and any combination of wired and wireless connection points may be present as well. The network 105, end users 410, data centers 420, and public systems 430 may include network hardware such as routers, switches, load balancers and/or other network devices.

Other implementations of the system 400 are also possible. For example, devices other than the client devices 412 and servers 422 shown may be included in the system 400. In an implementation, one or more additional servers may operate as a cloud infrastructure control, from which servers and/or clients of the cloud infrastructure are monitored, controlled and/or configured. For example, some or all of the techniques described herein may operate on these cloud infrastructure control servers. Alternatively, or in addition, some or all of the techniques described herein may operate on the servers 422.

Method examples described herein may be machine or computer-implemented at least in part. Some examples may include a computer-readable medium or machine-readable medium encoded with instructions operable to configure an electronic device to perform methods as described in the above examples. An implementation of such methods may include code, such as microcode, assembly language code, a higher-level language code, or the like. Such code may include computer readable instructions for performing various methods. The code may form portions of computer program products.

Further, in an example, the code may be tangibly stored on one or more volatile, non-transitory, or non-volatile tangible computer-readable media, such as during execution or at other times. Examples of these tangible computer-readable media may include, but are not limited to, hard disks, removable magnetic disks, removable optical disks (e.g., compact disks and digital video disks), magnetic cassettes, memory cards or sticks, random access memories (RAMS), read only memories (ROMs), and the like. The code may also be intangibly stored on one or more non-transitory and non-volatile computer readable media, such as those described above. In these cases, instructions resident on the media are read and executed by a processor to perform various functions.

The above description is intended to be illustrative, and not restrictive. For example, the above-described examples (or one or more aspects/configurations thereof) may be used in combination with others. Other embodiments may be used, such as by one of ordinary skill in the art upon reviewing the above description. The Abstract is to allow the reader to quickly ascertain the nature of the technical disclosure, for example, to comply with 37 C.F.R. § 1.72(b) in the United States of America. It is submitted with the understanding that it should not be used to interpret or limit the scope or meaning of the claims.

Also, in the above Detailed Description, various features may be grouped together to streamline the disclosure. However, the claims cannot set forth every feature disclosed herein, as embodiments may feature a subset of said features. Further, embodiments may include fewer features than those disclosed in a particular example. Thus, the following claims are hereby incorporated into the Detailed Description, with a claim standing on its own as a separate embodiment. The scope of the embodiments disclosed herein is to be determined with reference to the claims, along with the full scope of equivalents to which such claims are entitled.

What is claimed is:

1. A computer-implemented method for combining and transmitting information to a target device via a target channel of a user; comprising:
   determining a relevance score of news elements in a news element database for a plurality of user elements stored in a user portfolio;
   selecting news elements from the news elements database based on the relevance score;
   determining active devices currently in use by the user and active channels currently in use by the user;
   selecting the target device of the active devices based on display criteria of the device;
   selecting the target channel of the active channels based on a determination that the target channel was a last channel used by the user and an indicator in a user profile indicating that the user prefers the target channel;
   reformatting the selected news elements into story components based on the target device and the target channel; and
   transmitting the story components to the target device via the target channel.

2. The method of claim 1, wherein the user elements are items in a user's investment portfolio.

3. The method of claim 2, wherein the user elements comprise sub-elements, and the sub-elements are individual components of a mutual fund.

4. The method of claim 2, wherein the story components are one of: a) total change in market value of the user's investment portfolio; b) general performance of overall markets and indices; c) specific performance of indices which the user is weighted in; d) articles or information related to changes in the user's investment portfolio; or e) information that supports a risk tolerance of the user.

5. The method of claim 1, wherein the target channel or the target device is one in which the user is actively engaged with.

6. The method of claim 1, further comprising:
   combining the story components to create a complete story that spans a predetermined time period; and
   transmitting the story to the target device via the target channel of the user over a network interface.

7. The method of claim 1, further comprising:
   receiving feedback indicating that a story component of the story components has been viewed or acknowledged by the user.

8. The method of claim 1, further comprising:
   further reformatting a selected news element when the target device or target channel has changed.

9. The method of claim 1, further comprising:
   tagging the user elements with topics.

10. The method of claim 1, further comprising:
    tracking which of the transmitted story components have been read or acknowledged by the user.

11. The method of claim 10, further comprising:
    modifying at least one of the target device or target channel based on the tracking.

12. The method of claim 10, wherein the tracking comprises at least one of detecting a web page visit, detecting a duration of a web page visit, detecting a user link click, and receiving an email message.

13. A system comprising:
    at least one processor; and
    memory including instructions that, when executed by the at least one processor, cause the at least one processor to perform operations to:
    determine a relevance score of news elements in a news element database for a plurality of user elements stored in a user portfolio that corresponds to a user;
    select news elements from the news elements database based on the relevance score;
    determine active devices currently in use by the user and active channels currently in use by the user;
    select a target device of the active devices based on display criteria of the device;
    select a target channel of the active channels based on a determination that the target channel was a last channel used by the user and an indicator in a user profile indicating that the user prefers the active channel;
    reformat the selected news elements into story components based on the target device and the target channel; and
    transmit the story components to the target device via the target channel.

14. The system of claim 13, wherein the user elements are items in a user's investment portfolio.

15. The system of claim 14, wherein the story components are one of: a) total change in market value of the user's investment portfolio; b) general performance of overall markets and indices; c) specific performance of indices which the user is weighted in; d) articles or information related to changes in the user's portfolio; and e) information that supports a risk tolerance of the user.

16. The system of claim 13, wherein the target channel or the target device is one in which the user is actively engaged with.

17. The system of claim 13, the memory further comprising instructions that cause the at least one processor to:
combine story components to create a complete story that spans a predetermined time period; and
wherein the complete story is transmitted to the target device and e target channel of the user over the network interface.

18. The system of claim 13, the memory further comprising instructions that cause the at least one processor to:
receive feedback indicating that a story component of the story components has been viewed or acknowledged by the user.

19. The system of claim 13, the memory further comprising instructions that cause the at least one processor to:
track which of the transmitted story components have been read or acknowledged by the user.

20. A non-transitory computer-readable storage medium, the computer-readable storage medium including instructions that when executed by a computer, cause the computer to perform operations to:
determine a relevance score of news elements in a news element database for a plurality of user elements stored in a user portfolio that corresponds to a user;
select news elements from the news elements database based on the relevance score;
determine active devices currently in use by the user and active channels currently in use by the user;
select a target device of the active devices based on display criteria of the device;
select a target channel of the active channels based on a determination that the target channel was a last channel used by the user and an indicator in a user profile indicating that the user prefers the active channel;
reformat the selected news elements into story components based on the target device and the target channel; and
transmit the story components to the target device via the target channel.

* * * * *

UNITED STATES PATENT AND TRADEMARK OFFICE
CERTIFICATE OF CORRECTION

PATENT NO. : 11,550,861 B1
APPLICATION NO. : 17/006195
DATED : January 10, 2023
INVENTOR(S) : Benjamin S. Taylor It is certified that error appears in the above-identified patent and that said Letters Patent is hereby corrected as shown below:

In the Claims

In Column 11, Line 43, in Claim 1, delete "user;" and insert --user,-- therefor

In Column 13, Line 9, in Claim 17, delete "e" and insert --via the-- therefor

Signed and Sealed this
Fourth Day of April, 2023

Katherine Kelly Vidal
*Director of the United States Patent and Trademark Office*